United States Patent [19]

Solhjell

[11] Patent Number: 5,583,541
[45] Date of Patent: Dec. 10, 1996

[54] MOUSE AND TRACKBALL DESIGN WITH CONTACT-LESS ROLLER SENSOR

[75] Inventor: Erik Solhjell, Oslo, Norway

[73] Assignee: Tandberg Data Storage AS, Oslo, Norway

[21] Appl. No.: 383,324

[22] Filed: Feb. 3, 1995

[51] Int. Cl.⁶ .................................................. G09G 5/08
[52] U.S. Cl. ........................... 345/163; 345/157; 345/167
[58] Field of Search .................................. 345/156, 157, 345/158, 159, 163, 164, 167, 161; 74/471 XY; 273/148 B

[56]         References Cited

U.S. PATENT DOCUMENTS

| 4,562,347 | 12/1985 | Hovey et al. | 345/163 |
| 4,628,755 | 12/1986 | Hawley | 345/163 |
| 4,814,553 | 3/1989 | Joyce | 345/166 |
| 4,837,489 | 6/1989 | McFee | 345/163 |
| 4,868,549 | 9/1989 | Affinito et al. | 345/164 |
| 4,922,444 | 5/1990 | Baba | 345/163 |
| 4,933,671 | 6/1990 | McCourt | 345/163 |
| 4,939,508 | 7/1990 | Lawrence et al. | 345/167 |
| 4,961,138 | 10/1990 | Gorniak | 345/163 |
| 5,063,289 | 11/1991 | Jasinski et al. | 345/167 |
| 5,168,221 | 12/1992 | Houston | 345/161 |
| 5,237,311 | 8/1993 | Mailey et al. | 345/167 |
| 5,287,090 | 2/1994 | Grant | 345/167 |
| 5,428,368 | 6/1995 | Grant | 345/167 |

FOREIGN PATENT DOCUMENTS

| 0363512 | 4/1990 | European Pat. Off. . |
| 0416870A3 | 3/1991 | European Pat. Off. . |
| 3045133A1 | 7/1982 | Germany . |
| WO94/22071 | 3/1994 | WIPO . |

*Primary Examiner*—Richard Hjerpe
*Assistant Examiner*—Mike Fatahiyar
*Attorney, Agent, or Firm*—Hill, Steadman & Simpson

[57]         ABSTRACT

A mouse or track ball has a roller ball mounted within a housing by three free rollers in contact with an outer peripheral surface of the roller ball. An inner core of the roller ball is provided of a magnetic material having either bumps or holes at an outer periphery thereof. The inner core is coated with a non-magnetic material providing an outer smooth and round surface for the ball.

12 Claims, 2 Drawing Sheets

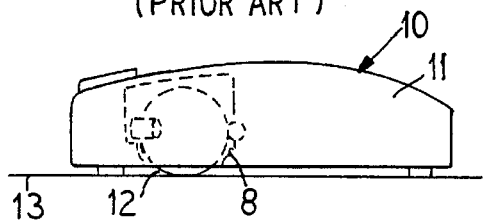
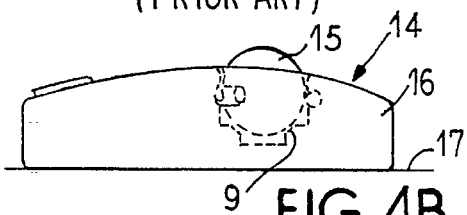
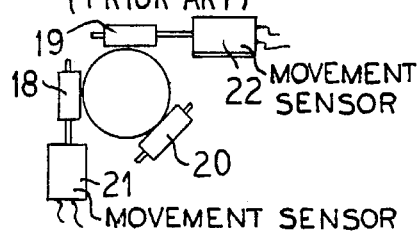
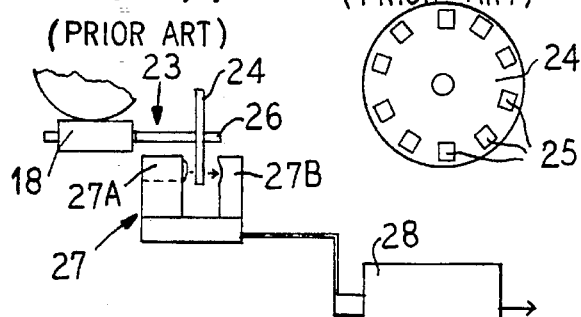
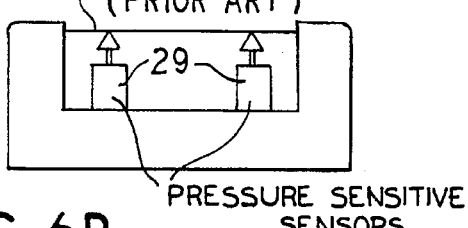
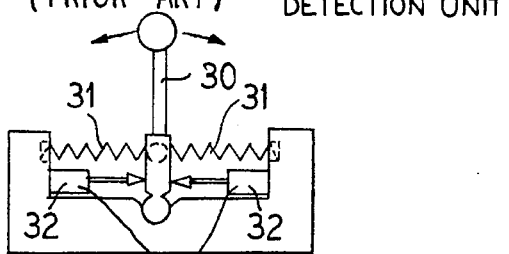
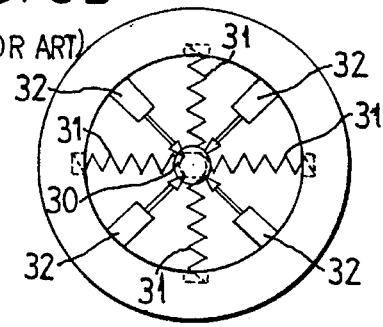
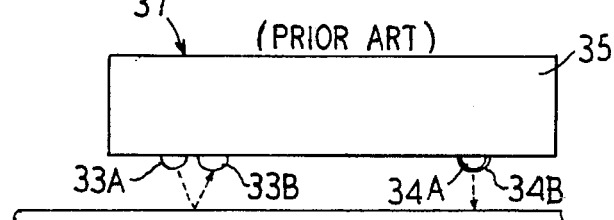
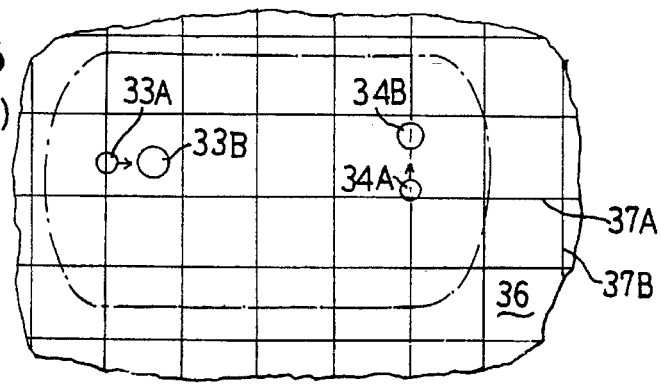

MAGNETIC FLUX

DIGITAL OUTPUT

MOUSE AND TRACKBALL DESIGN WITH CONTACT-LESS ROLLER SENSOR

BACKGROUND OF THE INVENTION

The present invention relates to the construction of a mouse or trackball used with computer systems.

A keyboard is normally used to enter data manually into a computer system. These keyboards can be made in many different versions. However, they are all designed around the same basic concept: the keyboard contains groups of "keys", each assigned to a specific letter or number, or one or more signs. Additionally, most modern keyboards for data systems also contain series of function keys. Each function key may activate a special operation, depending upon the program being executed in the computer.

To simplify operations, many data systems and computer programs are also designed to work with a "Mouse" or "Trackball" in addition to the keyboard. Although these devices may take on many different forms, their basic functions are the same: a unit containing a rolling ball and one or more keys which may be pressed down.

The basic mouse design generally shown at 10 in FIG. 1 contains a mouse housing 11 with the ball 12 mounted at the bottom-side. A circular collar-like edge 8 can prevent the ball from falling out of the housing. Moving the mouse by rolling the mouse housing along a table 13 will make the ball roll and lift the ball free of the edge 8. This rolling ball operation is transferred to a corresponding movement of the cursor on the data screen of the connected computer. The ball operation can be translated into a distance and direction moved along an x-axis and a distance and direction moved along a y-axis. This movement is then transferred to the computer which moves the cursor on the screen in directions and distance corresponding to those given by the mouse movement. In most programs the relationship between a given rolling distance of the mouse ball and the corresponding movement of the cursor can be programmed, and also the acceleration of the mouse operation.

The basic trackball design shown generally at 14 in FIG. 2 differs from the basic mouse design since the ball 15 is on the top of the housing 16. The operation is performed by having the trackball housing 16 fixed (not moving), typically on a flat surface 17, while the operator rolls the ball 15 by hand. This again will correspond to a movement of the cursor as described above. A circular shoulder 9 can provide a seating surface for the ball or inner support rollers can support the ball.

Today, the word "mouse" is often used for both types and for simplicity, hereafter the term "mouse" will be used, regardless of whether it is a trackball or a traditional mouse design.

Either design controls the cursor on the computer screen in the same way, the differences between the designs being related to the movement of the ball. Both versions typically have one or more keys that the operator may activate, in addition to the operation of the ball. Depending upon the computer program, the movement of the ball together with the pressing of one or more keys will create specified operations or reactions by the computer program.

It is necessary to include in the mouse design a system that can detect the rolling movement of the ball and transfer it into some form of digital signals that can be used by the computer.

When the ball on a mouse is moving, the ball movement is transferred to an "x-" and a "y-" control system mounted internally in the mouse housing. Although this control system may vary in design, the basic principle is to register the movement of the ball relative to x and y axes. As shown in FIG. 3, typically the ball is touching three (or four) rollers 18, 19, and 20, where one (or two) is free-rolling as shown at 20 and the other two rollers 18 and 19 are connected to systems for detecting the direction of the revolution of the roller, the length of rolling, and also the speed. One of these detection rollers referenced 18 is referred to as the x-axis controller, and the other one referenced 19 (90 degrees off the x-axis roller) is referred to as the y-axis controller. These two rollers 18 and 19 work independently. Each detection roller is coupled to a movement sensor 21 or 22, which is an electromechanical device to sense the direction and speed of the roller movement.

FIGS. 4A, 4B show at 23 one method for implementing such a detection system. A disk 24, with a series of small holes 25, is mounted on the roller axle 26. A photo detection system 27 formed of a light transmitter 27A and a light receiver 27B senses each hole 25 as the disk 24 spins. With a proper design of the hole pattern, an electronic unit 28 can be designed to detect both the speed of the roller rotation, the direction, and the length. The information about the direction and movement from both the x- and y-controllers are transferred to the cursor on the data screen on the connected data system. Most programs allow the ratio between the movement of the ball in the x- and the y-direction and the corresponding movement of the cursor in the same directions to be set to suit the specific taste and requirements of the operator.

FIGS. 4A, 4B show one method for detection of the movement of the x- and y-rollers. Several other methods have been used. However, all these are based upon some sort of electromechanical system mounted upon the roller axles.

A major problem with this method where the rolling movement of the ball is mechanically transferred to two rollers (x and y), is that over time the interconnection between the ball and the two rollers itself may become less reliable. Very often this is due to dirt accumulating either on the ball or on the rollers. This will very often give an unreliable connection between the ball and the rollers, leading to incorrect cursor movements on the screen.

Due to this problem, several systems have been designed to overcome this by removing the rolling ball from the mouse design. One method replaces the ball with a disk 28 with pressure sensitive sensors 29 underneath. See FIG. 5. The operator presses on the disk 28 and the sensors 29 underneath detect where the pressure is on the disk and how hard it is, and converts that information into electrical signals to control the cursor.

Another method as shown in FIG. 6 is to replace the ball with a small pin or stick 30. See FIGS. 6A, 6B. Springs 31 keep the stick 30 normally in a vertical position. However, the operator can press the stick 30 away from this vertical position. Special sensors 32 are mounted at the bottom of the stick 30 and can detect in which direction the operator is pressing and how hard he is pressing. This information is then used to control the cursor.

Another method has been to replace the ball with two sets of small light transmitter/receivers 33A, 33B and 34A, 34B mounted at the bottom of a housing 35 at a 90 degree angle to each other. See FIGS. 7A, 7B. The mouse must be used in conjunction with a special pad 36. This pad 36 is reflective, except for a series of non-reflective lines 37A, 37B at a 90 degree angle on the surface of the pad. When the operator moves the mouse across the pads, both transmitter/ receivers send out a light signal which is reflected back from the pad, unless the light beam happens to hit one of the non-reflective lines. Therefore, the two transmitter/receivers (x- and y-) will be interrupted for every line they pass. This can then be used to control the cursor operation.

Regardless of these methods, many customers still prefer to use a mouse with a rolling ball because it gives the operator a very good "control feeling". However, the problem of dust accumulating on the x- and y-rollers and the ball are forcing many users to switch to other, less dust sensitive designs.

SUMMARY OF THE INVENTION

It is an object of this invention to design a mouse system based upon a rolling ball which is not sensitive to normal dust accumulations on the ball.

According to the present invention, a detection system is provided which detects the rolling movement of the ball, but which does not rely on a physical contact between the ball and the x- and y-roller detectors. This is achieved by using a ball which contains a special core comprising a magnetic material, such as iron, and two magnetic force sensors (Hall effect elements). The magnetic material core of the ball has an outer peripheral surface filled with small bumps or depressions. The two magnetic core sensors sense rotation of the ball without physical contact by detecting magnetic field variations caused by the small bumps or depressions in the magnetic core outer peripheral surface.

BRIEF DESCRIPTION OF THE DRAWINGS

FIG. 1 is a side view of a prior art mouse;

FIG. 2 is a side view of a prior art trackball type of mouse;

FIG. 3 is a side view of a prior art roller system for sensing movement of the mouse ball;

FIG. 4A is a side view illustrating a prior art rotating disk detection system for detecting rolling motion of a roller in contact with a mouse ball;

FIG. 4B is a side view of a prior art disk having apertures therein for photoelectric sensing in the apparatus shown in FIG. 4A;

FIG. 5 is a side view of a prior art pressure sensitive disk system for inputting information to a computer;

FIG. 6A is a side cross-sectional view of a prior art joy stick system for inputting information into a computer;

FIG. 6B is a top view of the prior art joy stick system shown in FIG. 6A;

FIG. 7A is a side view of a prior art non-contact mouse employing light transmitters and receivers in connection with a digital pad shown in FIG. 7B;

FIG. 7B is a top view of the digital pad used with the non-contact mouse shown in FIG. 7A;

DESCRIPTION OF THE PREFERRED EMBODIMENTS

Figure 8A:
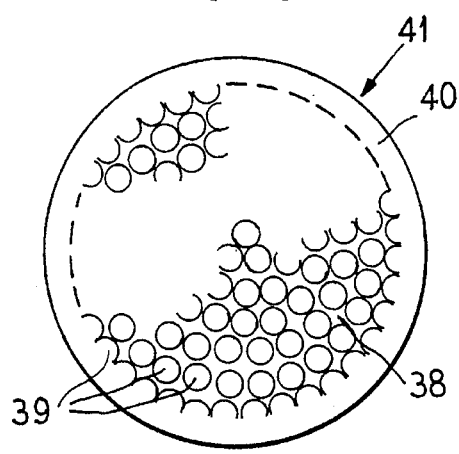
FIG. 8A is a side cut-away view of a first embodiment of a roller ball having a magnetic core used in the mouse or trackball type mouse design having a contact-less roller sensor according to the invention as illustrated in FIG. 9.

The mouse or trackball type mouse system according to the invention is generally illustrated by FIGS. 8A, 8B, 9A, 9B, 9C and 9D. As shown in FIG. 8A, details of the roller ball 41 employed in the system of FIGS. 9A–D are illustrated. It consists of a core 38 of a magnetic material like iron. The surface of the core is not smooth, but is filled with small dimple-like spherical depressions 39. The core 38 is then coated with a non-magnetic material 40 like plastic to make the surface of the final ball smooth and round.

Figure 8B:
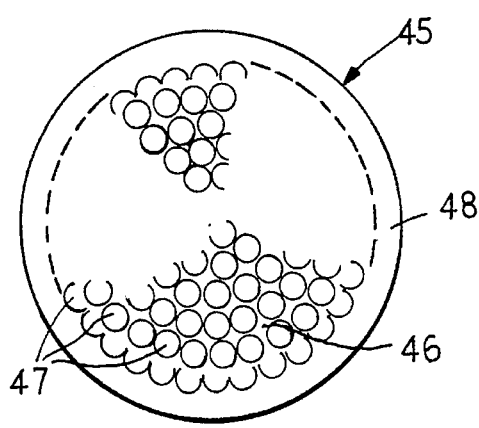
FIG. 8B is a partial cut-away view taken from the side of a second embodiment of the roller ball shown in FIG. 8A wherein bumps instead of holes are provided at an outer periphery of the interior magnetic core.

In a second embodiment of the roller ball 45 shown in FIG. 8B, instead of the depressions, protruding bumps 47 are provided at a periphery of the magnetic material core 46, which is also encased in or coated with a non-magnetic material 40 such as plastic to make the surface of the final ball smooth and round.

Figure 9A:
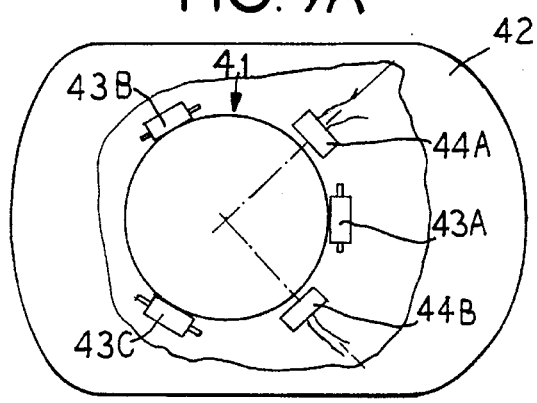
FIG. 9A is a top cut-away view of the mouse design according to the invention having a contact-less roller sensor system.
Figure 9B:
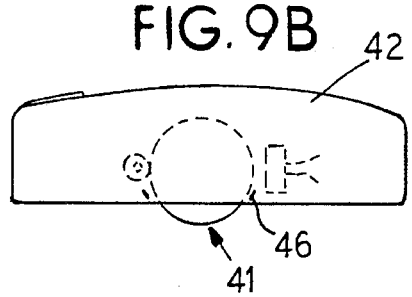
FIG. 9B is a side view of FIG. 9A.
Figure 9D:
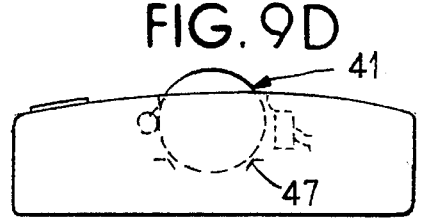
FIG. 9D is a side view of FIG. 9C.
Figure 9C:
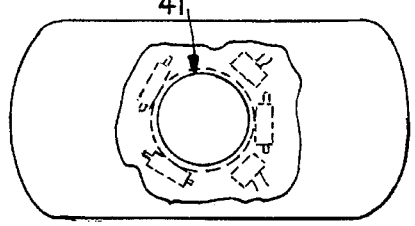
FIG. 9C is a top cut-away view of the trackball type mouse design according to the invention having a contact-less roller sensor system.

As shown in FIGS. 9A–9D, this special ball 41 is then mounted in a mouse housing 42 (at either the top as a trackball type mouse as shown in FIGS. 9C and 9D, or at the bottom as a mouse as shown in FIGS. 9A and 9B). A set of free rollers 43A, 43B, 43C keep it in place. Also, if desired, for the mouse a collar-like retaining ring 46 may be provided to keep the ball in the housing; or for the trackball type mouse, a seating shoulder 47 may also be provided. The operator will roll the mouse housing 42 (or the ball 41) in the normal way. However, the x- and y-rollers previously used to physically detect the ball's movement are now replaced with two Hall effect x and y sensors 44A, 44B which react on magnetic forces. The two sensors 44A, 44B are placed 90 degrees opposite to each other and are mounted close to the ball 41 without touching it.

Figure 10:
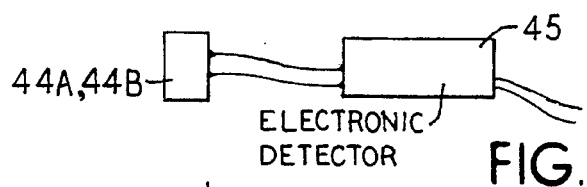
FIG. 10 is a block diagram of an electronic detector for providing a digital output signal as shown in FIG. 11B based on flux variations from the Hall effect sensors.
Figure 11A:
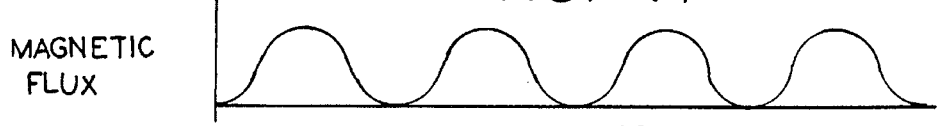
FIG. 11A shows magnetic fluc variation as sensed by the Hall effect sensors as the ball having an interior magnetic core according to the invention rotates.
Figure 11B:
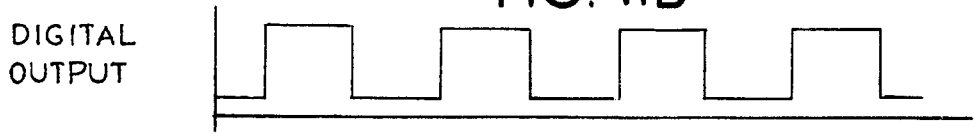
FIG. 11B shows a digital output from the electronic detector shown in FIG. 10 based on the magnetic flux variations of FIG. 11A.

When the ball is rolling, the Hall effect sensors will detect the magnetic force from the core of the ball. However, since the surface of the core is filled with concave dimple-like depressions or bumps, the magnetic force detected by the sensors will vary as the balls rotate. The resulting magnetic force detected by a sensor, such as a comparator 45 as shown in FIG. 10, can typically have a form as shown in FIGS. 11A, 11B. The signal in FIG. 11A shows the actual magnetic forces detected by the sensor (magnetic flux variations), while the signal in FIG. 11B shows the resulting typical digital signal output from the electronic detector 45 which is, for example, a comparator for comparison of the Hall effect sensor output signals to a threshold and then outputting the resulting pulse or digital waveform. This signal is then used to control the cursor movement.

Preferably, the entire outer peripheral surface of the inner magnetic core has the bumps or depressions distributed therearound in an evenly spaced manner.

With this principle, the user can continue to use a mouse having a familiar ball without the problem arising from dust accumulating on the ball or on the x-y roller sensors. Using this principle, the mouse design can tolerate a fair amount of dust before it becomes a problem.

This invention will work both for a traditional mouse design and for a traditional trackball type mouse design.

Although various minor changes and modifications might be proposed by those skilled in the art, it will be understood that I wish to include within the scope of the patent warranted hereon all such changes and modifications as reasonably come within my contribution to the art.

I claim as my invention:

1. A mouse, comprising:

a mouse housing;

a roller ball supported in the mouse housing by at least three free rollers positioned in contact with and at a periphery of the roller ball;

said roller ball having an inner core of magnetic material and wherein an entire peripheral surface of the inner core has substantially evenly spaced bumps thereon and wherein a non-magnetic outer material is coated around the entire core so that an outer peripheral surface of the ball is smooth; and first and second Hall effect sensors adjacent but not in contact with said outer peripheral surface of the ball for sensing magnetic flux variations as the ball rotates.

2. A mouse according to claim 1 wherein the two Hall sensors are placed 90° apart from each other with respect to a center of the ball.

3. A mouse according to claim 1 wherein the roller ball protrudes through an aperture in a top of the mouse housing so that the roller ball can be operated as a trackball.

4. A mouse according to claim 1 wherein the roller ball protrudes through an aperture in a bottom of the mouse housing so that the roller ball can be moved along a flat surface as the housing is pushed along the surface.

5. A mouse comprising:

a mouse housing;

a roller ball supported in the mouse housing by at least three free rollers positioned in contact with and at a periphery of the roller ball;

said roller ball having an inner core of magnetic material and wherein an entire peripheral surface of the inner core has substantially evenly-spaced dimple-like depressions therein and wherein a non-magnetic outer material is coated around the entire core so that an outer peripheral surface of the ball is smooth; and first and second Hall effect sensors adjacent but not in contact with said outer peripheral surface of the ball for sensing magnetic flux variations as the ball rotates.

6. A mouse according to claim 5 wherein the two Hall effect sensors are placed 90° apart from each other with respect to a center of the ball.

7. A mouse according to claim 5 wherein the roller ball protrudes through an aperture in the top of the mouse housing so that the roller ball can be operated as a trackball.

8. A mouse according to claim 5 wherein the roller ball protrudes through an aperture in the bottom of the mouse housing so that the roller ball can be moved along a flat surface as the housing is pushed along the surface.

9. A mouse, comprising:

a mouse housing;

a roller ball supported in the mouse housing by a plurality of members in contact with the periphery of the roller ball and which permits rotational movement of the roller ball;

said roller ball having an inner core of magnetic material and wherein a peripheral surface of the inner core has bumps thereon and wherein a non-magnetic outer material is coated around the entire core so that an outer peripheral surface of the roller ball is smooth; and first and second Hall effect sensors adjacent to but not in contact with said outer peripheral surface of the ball for sensing magnetic flux variations caused by the bumps on the inner core as the ball rotates.

10. A mouse, comprising:

a mouse housing;

a roller ball supported in the mouse housing by a plurality of members in contact with the periphery of the roller ball and which permits rotational movement of the roller ball;

said roller ball having an inner core of magnetic material and wherein a peripheral surface of the inner core has dimple-like depressions thereon and wherein a non-magnetic outer material is coated around the entire core so that an outer peripheral surface of the roller ball is smooth; and first and second Hall effect sensors adjacent to but not in contact with said outer peripheral surface of the ball for sensing magnetic flux variations caused by the dimple-like depressions on the inner core as the ball rotates.

11. A mouse according to claim 9 wherein the bumps are spherical.

12. A mouse according to claim 10 wherein the dimple-like depressions have a concave spherical shape.

* * * * *